(12) United States Patent
Elsaden et al.

(10) Patent No.: US 9,936,830 B2
(45) Date of Patent: Apr. 10, 2018

(54) SEALING PITCHER ASSEMBLY

(71) Applicant: Ignite USA, LLC, Chicago, IL (US)

(72) Inventors: Sami Elsaden, Winnetka, IL (US); Paul Hurley, Libertyville, IL (US); Emilie Williams, Chicago, IL (US); Andy Schumacher, Chicago, IL (US)

(73) Assignee: IGNITE USA, LLC, Chicago, IL (US)

(*) Notice: Subject to any disclaimer, the term of this patent is extended or adjusted under 35 U.S.C. 154(b) by 102 days.

(21) Appl. No.: 14/602,421

(22) Filed: Jan. 22, 2015

(65) Prior Publication Data

US 2015/0201771 A1 Jul. 23, 2015

Related U.S. Application Data

(60) Provisional application No. 61/930,206, filed on Jan. 22, 2014.

(51) Int. Cl.
*A47G 19/12* (2006.01)
*A47J 41/00* (2006.01)
*B65D 47/08* (2006.01)

(52) U.S. Cl.
CPC ........... *A47G 19/12* (2013.01); *A47G 19/127* (2013.01); *A47J 41/0027* (2013.01); *B65D 47/0819* (2013.01); *B65D 47/0823* (2013.01)

(58) Field of Classification Search
CPC ...... A47G 19/14; A47G 19/12; A47G 19/127; A47J 36/14; A47J 31/10; A47J 31/50; A47J 41/0027; A47J 41/00; A47J 41/0022; B65D 47/26; B65D 51/16; B65D 51/1672; B65D 47/08; B65D 47/0804; B65D 47/0809; B65D 47/0819; B65D 47/0823; B65D 47/0857; B65D 47/0866; B65D 47/0895;
(Continued)

(56) References Cited

U.S. PATENT DOCUMENTS 2,040,087 A * 5/1936 Hackl .................... A47G 19/12
 222/469
2,573,378 A * 10/1951 Zurlinden .......... B65D 47/0866
 215/235
(Continued)

OTHER PUBLICATIONS

International Preliminary Report on Patentability, International Application No. PCT/US2015/012367, dated Jul. 26, 2016.

*Primary Examiner* — Nicholas J Weiss
*Assistant Examiner* — Andrew P Bainbridge
(74) *Attorney, Agent, or Firm* — Marshall, Gerstein & Borun LLP (57) ABSTRACT

A pitcher is provided having a container body and a lid sealing assembly. The container body has a liquid retaining cavity. A pour aperture is fluidly associated with the cavity to allow liquid to be poured from the pitcher. The lid sealing assembly is removably connected to the container body. The lid sealing assembly has an actuation assembly having a push-button actuated actuator that operates a seal member. The actuator is moveable between a normal position and a use position. The seal member is positioned outside the cavity and adjacent the pour aperture. The seal member seals the pour aperture when the actuator is in the normal position and the seal member is moved from the pour aperture to open the pour aperture when the actuator is in the use position. When the seal member is moved from the pour aperture liquid can be poured from the pitcher.

21 Claims, 9 Drawing Sheets

(58) Field of Classification Search
CPC ............... B65D 47/142; B65D 47/143; B65D 47/2056; B65D 47/248; B65D 47/249; B65D 47/32; B65D 47/20; B67D 3/00; B67D 3/047; B67D 3/048
USPC ...... 222/469–475.1, 153.09–153.1, 545, 570
See application file for complete search history.

(56) References Cited

U.S. PATENT DOCUMENTS

| | | | |
|---|---|---|---|
| 4,648,535 A * | 3/1987 | Zimmermann | B65D 47/249 222/472 |
| 4,676,411 A | 6/1987 | Simasaki | |
| 5,037,015 A | 8/1991 | Collins | |
| 5,038,959 A * | 8/1991 | Patel | A47G 19/14 220/303 |
| 5,169,016 A * | 12/1992 | Hinz, Jr. | A47G 19/2272 220/203.29 |
| 5,265,767 A * | 11/1993 | Gustafson | A47G 19/12 222/144.5 |
| 5,497,917 A | 3/1996 | Krimmel et al. | |
| 5,615,808 A | 4/1997 | Huang | |
| 5,653,362 A | 8/1997 | Patel | |
| 6,234,364 B1 * | 5/2001 | Nybakke | A47G 19/12 222/469 |
| 6,257,452 B1 * | 7/2001 | Allen | B65D 47/0823 222/153.06 |
| 6,269,984 B1 * | 8/2001 | Murakami | A47J 41/0022 222/131 |
| 6,352,166 B1 | 3/2002 | Copeland | |
| 6,427,880 B1 | 8/2002 | Hirose et al. | |
| 6,540,120 B2 * | 4/2003 | Lebowitz | A47J 27/21191 222/471 |
| 6,648,183 B2 | 11/2003 | Nybakke | |
| 6,755,120 B1 * | 6/2004 | Lin | A47G 19/14 222/465.1 |
| 6,805,266 B2 * | 10/2004 | Doron | A47J 27/21175 222/470 |
| 6,935,536 B2 * | 8/2005 | Tardif | A47J 41/0027 222/153.14 |
| 7,222,759 B2 * | 5/2007 | Bunn | A47G 19/14 141/21 |
| 7,552,846 B2 | 6/2009 | Ohm et al. | |
| 7,735,698 B2 * | 6/2010 | Lin | A47J 41/0027 222/472 |
| 7,770,763 B2 | 8/2010 | Faure | |
| 8,056,745 B2 * | 11/2011 | Yu | A47J 41/0027 215/356 |
| 8,464,895 B2 * | 6/2013 | Gilbert | A47G 19/2272 215/307 |
| 8,757,452 B2 * | 6/2014 | Richards | B65D 47/249 222/475.1 |
| 8,844,746 B2 * | 9/2014 | Meyers | B65D 43/00 215/237 |
| 8,899,440 B2 * | 12/2014 | Arnold | B65D 25/2885 220/253 |
| 8,939,305 B2 * | 1/2015 | Meyers | B65D 47/0885 220/254.4 |
| 9,010,238 B2 * | 4/2015 | Bodum | A47J 31/20 222/473 |
| 2007/0295760 A1 * | 12/2007 | Geroult | A47J 31/50 222/472 |
| 2008/0029554 A1 | 2/2008 | Faure et al. | |
| 2008/0185404 A1 | 8/2008 | Schreiber-Pethan et al. | |
| 2009/0071988 A1 | 3/2009 | Nybakke | |
| 2010/0243653 A1 * | 9/2010 | Jones | B65D 43/0212 220/254.3 |

* cited by examiner

SEALING PITCHER ASSEMBLY

CROSS-REFERENCE TO RELATED APPLICATIONS

This application claims priority to U.S. Provisional Patent Application No. 61/930,206, filed Jan. 22, 2014, which is incorporated herein by reference in its entirety and made a part hereof.

FEDERALLY SPONSORED RESEARCH OR DEVELOPMENT

Not Applicable.

TECHNICAL FIELD

The present invention relates generally to a beverage pitcher, and more specifically to a sealing mechanism for a beverage pitcher.

BACKGROUND OF THE INVENTION

Beverage containers and lids with sealing mechanisms for beverage containers, including beverage pitchers with lids, are known in the art. Traditionally, sealing mechanisms for such beverage container lids are provided by a lid base that includes a releasable sealing mechanism for the drink opening and a separate threaded lid that may be screwed out to provide access to a fill opening in the center of the lid base. While such beverage containers and sealing mechanisms according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

According to one embodiment, the disclosed subject technology relates to a pitcher having a lid assembly with a sealing assembly.

The disclosed subject technology further relates to a pitcher comprising a container body, a lid assembly, and a lid sealing assembly. The container body has a cavity; the lid assembly is removably connected to the container body, and the lid assembly has a pour aperture and a fill aperture; and, the lid sealing assembly is removably connected to the lid assembly to close and seal the fill aperture. The lid sealing assembly further has an actuation assembly to open and sealingly close the pour aperture.

The disclosed subject technology further relates to a pitcher comprising a container body and a lid sealing assembly. The container body has a liquid retaining cavity; a pour aperture is fluidly associated with the cavity of the container body and a separate fill aperture is fluidly associated with the cavity of the container body; and, the lid sealing assembly is operably and removably connected to the container body. The lid sealing assembly covers the fill aperture in a first position and is adapted to provide access to the fill aperture in a second position. The lid sealing assembly has an actuation assembly having a push-button actuated actuator that operates a seal member. The actuator is moveable between a normal position and a use position. The seal member is positioned outside the cavity of the container body and adjacent the pour aperture. The seal member seals the pour aperture when the actuator is in the normal position and the seal member is moved from the pour aperture to open the pour aperture when the actuator is in the use position.

The disclosed subject technology further relates to a pitcher comprising a container body and a lid sealing assembly. The container body has a liquid retaining cavity. A base is adjacent a top of the liquid retaining cavity of the container body. The base has a bottom surface facing the cavity of the container body and a top surface outwardly facing. A pour aperture extends through the base from the top surface to the bottom surface thereof. The pour aperture is fluidly associated with the cavity of the container body. The lid sealing assembly is removably connected to the container body. The lid sealing assembly has an actuation assembly having a push-button actuated actuator that operates a seal member. The actuator is moveable between a normal position and a use position. The seal member is positioned outside the cavity of the container body and adjacent the pour aperture. The seal member seals the pour aperture adjacent the top surface of the base when the actuator is in the normal position and the seal member is moved away from the top surface of the base to open the pour aperture when the actuator is in the use position.

The disclosed subject technology further relates to a pitcher where the lid assembly has a base with a bottom surface facing the cavity of the container body and the top surface outwardly facing. The pour aperture extends through the base from the top surface to the bottom surface thereof. The actuation assembly has a seal member to seal the pour aperture adjacent the top surface of the base of the lid assembly.

The disclosed subject technology further relates to a lid sealing assembly that comprises a push button member moveable between a normal position and a use position. The seal member closes the pour aperture when the push button is in the normal position and the seal member is raised from the top surface of the base to open the pour aperture when the push button is in the use position.

The disclosed subject technology further relates to a biasing member to bias the push button to the normal position. In an alternate embodiment, the biasing member biases the seal member toward the top surface of the base to close the pour aperture.

The disclosed subject technology further relates to a lid sealing assembly having a vent opening and a vent seal. The actuation assembly is operably connected to the vent seal to move the vent seal between a closed position closing the vent opening, and an open position to open the vent opening when the actuation assembly is actuated by a user.

The disclosed subject technology further relates to a lid sealing assembly that partially fits within the fill aperture of the lid assembly.

The disclosed subject technology further relates to a lid sealing assembly that has a first seal that seals the pour aperture, and a second seal that seals the fill aperture.

The disclosed subject technology further relates to a lid sealing assembly that has a securing assembly to removably secure the lid sealing assembly to the lid assembly. The securing assembly has a securing member and a release member. The securing member engages the lid assembly to lock the lid sealing assembly to the lid assembly in a first position. The release member is adapted to be manipulated by a user to cause movement of the securing member to a second position to release the lid sealing assembly from the lid assembly.

The disclosed subject technology further relates to a pitcher having a lid assembly that has a handle extending therefrom.

The disclosed subject technology further relates to a container body that has a first mating member and a lid assembly that has a second mating member. The first mating member mates with the second mating member to removably secure the lid assembly to the container body.

The disclosed subject technology further relates to a pour aperture being formed at a base of a concave fluid well of the lid assembly. The concave fluid well directs fluid that is not poured from the pitcher back through the pour aperture and into the cavity of the container body.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example only, not by way of limitation, with reference to the accompanying drawings in which embodiments of the disclosures are illustrated and, together with the descriptions below, serve to explain the principles of the disclosure.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
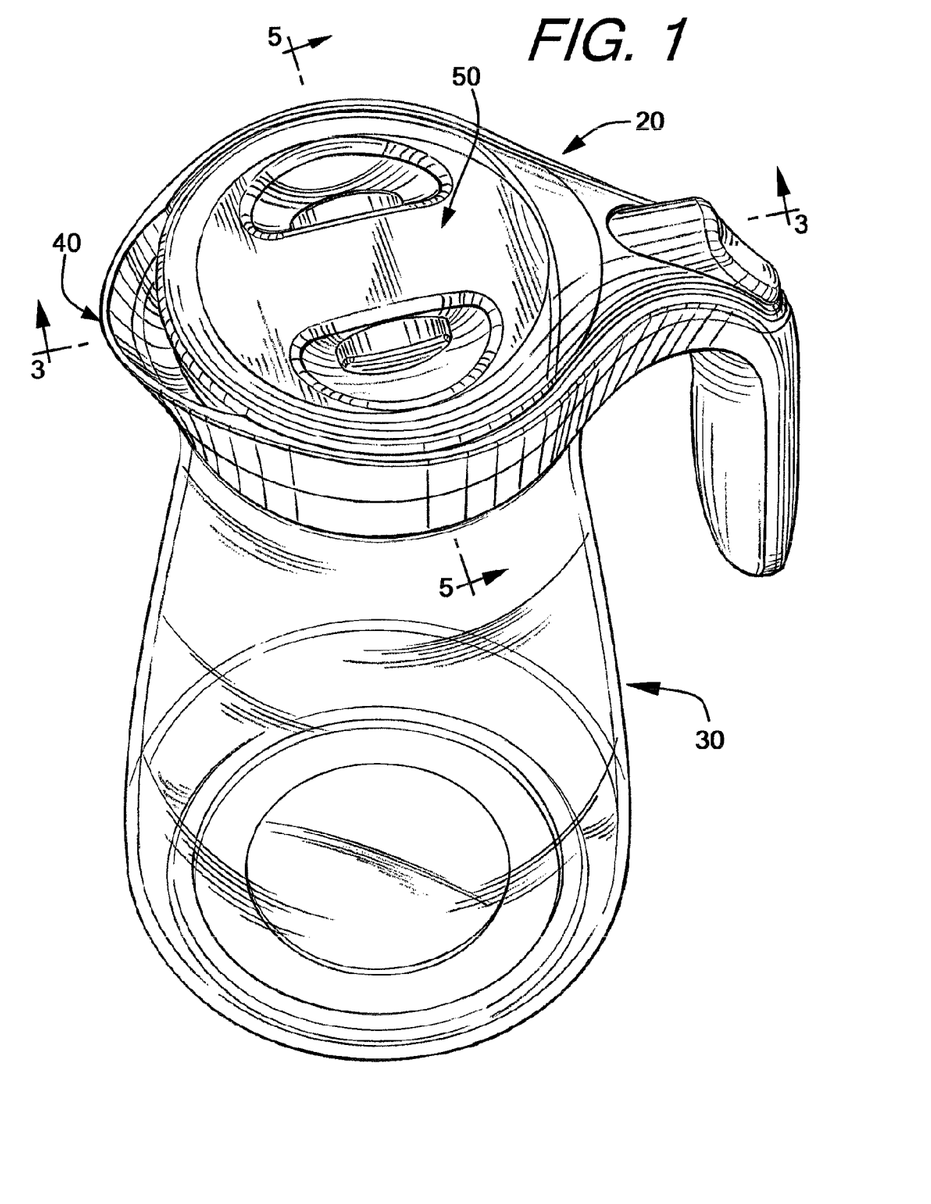
FIG. 1 is a perspective view of one example of a beverage pitcher with a sealing assembly.
Figure 2:
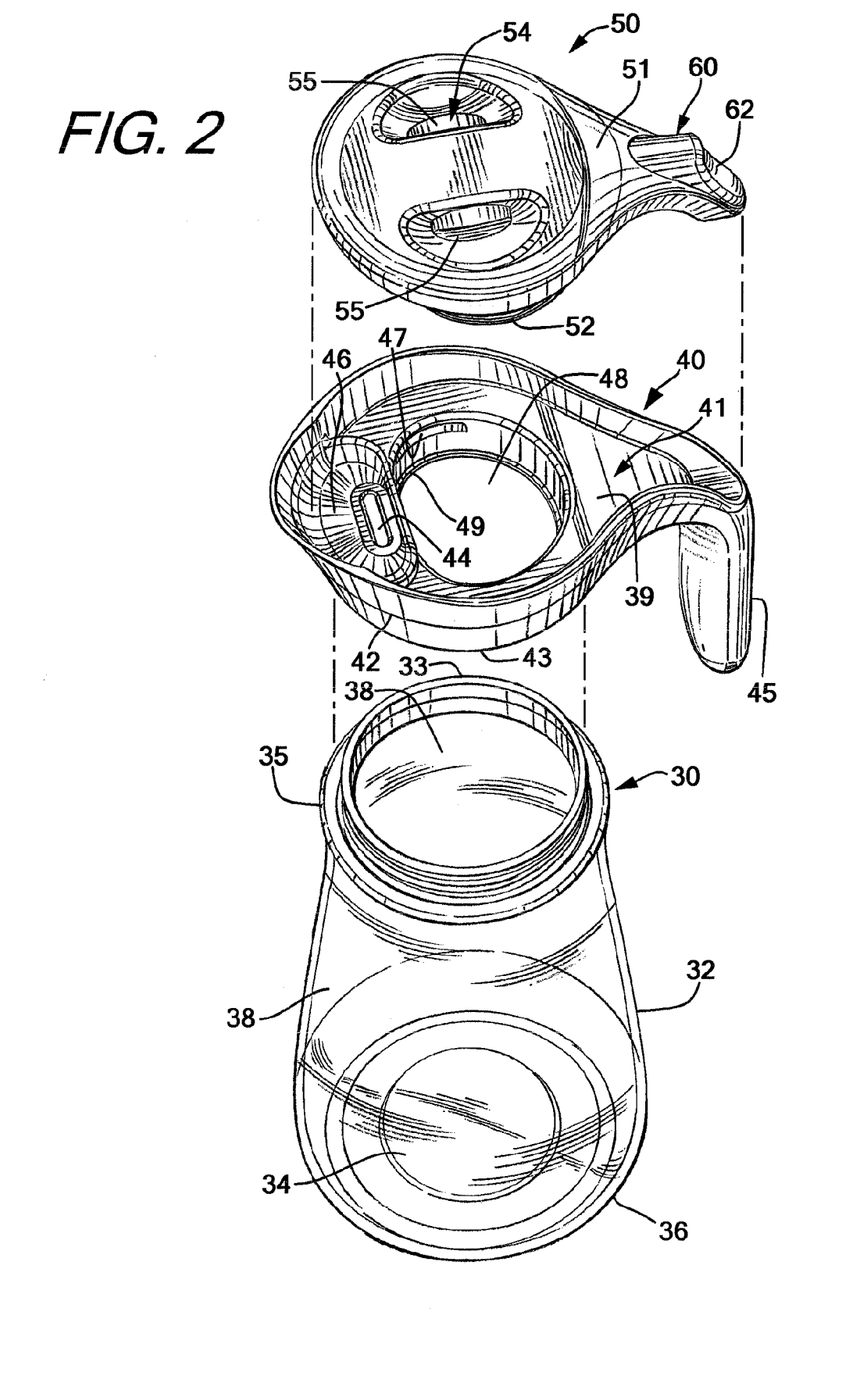
FIG. 2 is an exploded perspective view of a beverage pitcher.
Figure 3:
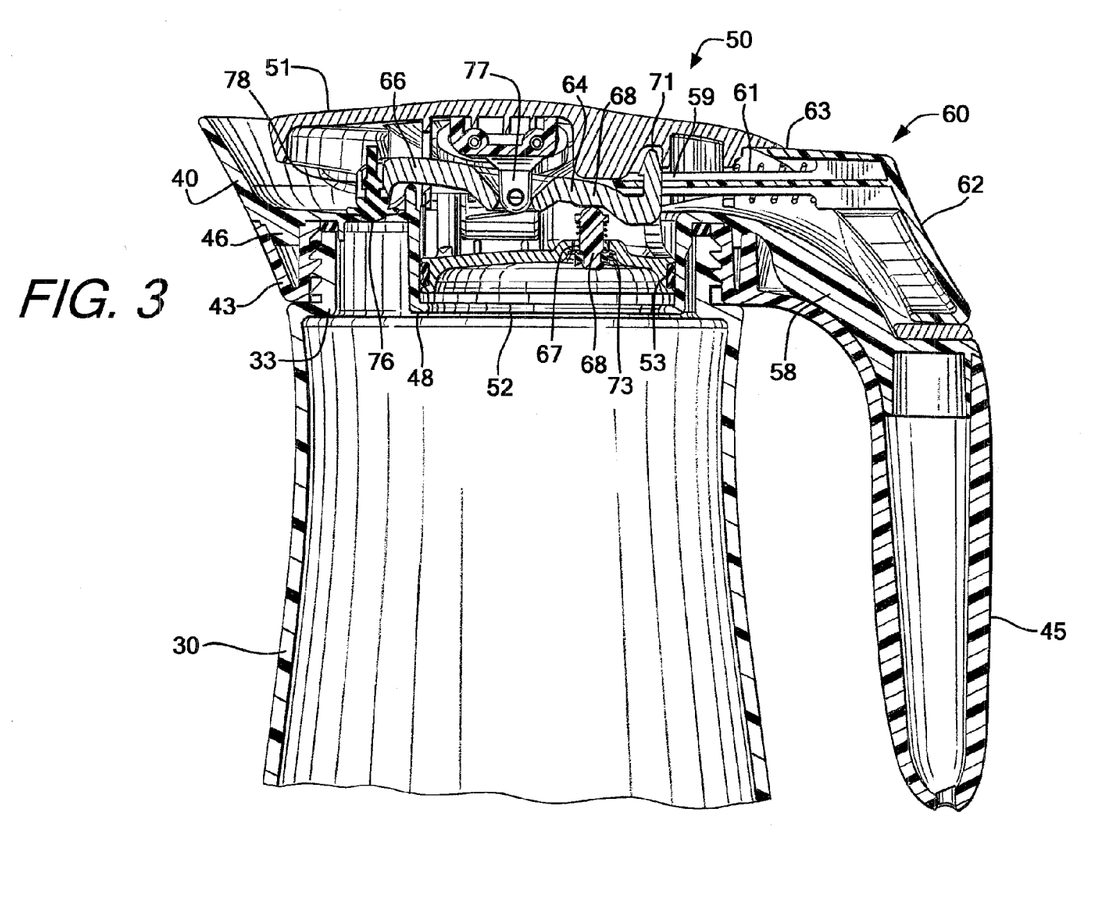
FIG. 3 is a partial side cross sectional view of a beverage pitcher with a sealing mechanism in the closed or normal position.
Figure 4:
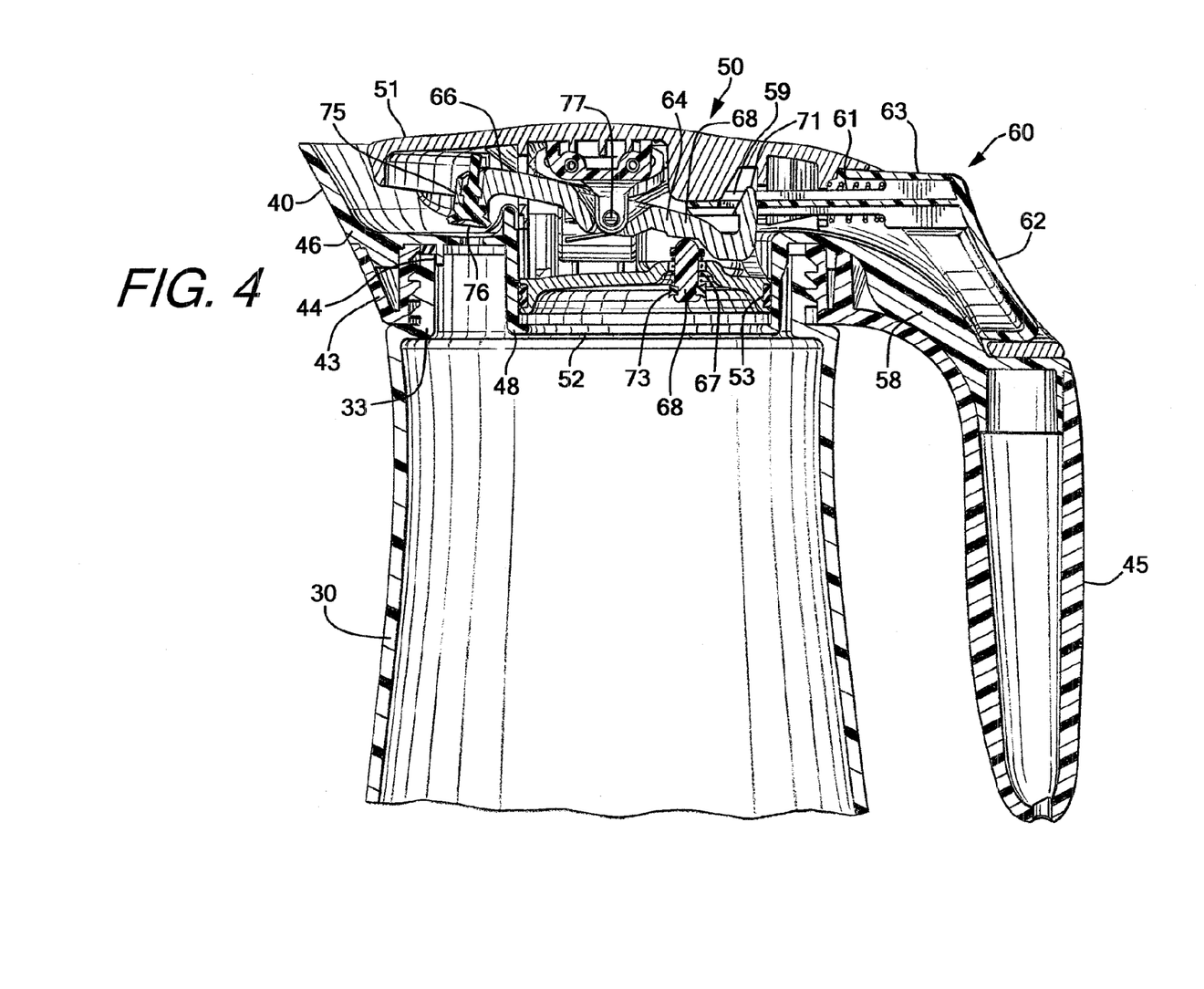
FIG. 4 is a partial side cross sectional view of a beverage pitcher with a sealing mechanism in the open or use position.

Referring now to the figures, and specifically to FIGS. 1-11, there is shown a beverage container 20. In a preferred embodiment the beverage container 20 is a pitcher 20 generally comprising a container body 30, a lid assembly 40, also referred to as a lid base assembly 40, and a lid sealing assembly 50. In one embodiment, the lid base assembly 40 is configured to receive or include the lid sealing assembly 50. The lid base assembly 40 may be removably connected to the container body 30 by threading, pressure fitting or the like. In one embodiment the container body 30 has a first mating member and the lid assembly 40 has a second mating member for removably securing the lid assembly 40 to the container body 30. For example, as shown in FIGS. 2-4, both the container body 30 and the lid base assembly 40 are threaded such that the lid base assembly 40 may be screwed on and off of the container body 30. Alternately, the lid base assembly 40 may be a part of the container body 30, as opposed to being a separate component/assembly.

In one embodiment, as best shown in FIG. 2, the container body 30 comprises a side wall member 32 having a threaded portion 33 at the proximal end 35 of the side wall member 32, a bottom member 34 toward a distal end 36 of the side wall member 32, and a liquid retaining cavity 38 therebetween. The container body 30 may include a single part construction of a single wall member formed from any suitable material such as metal, plastic or the like. Alternatively, the container body 30 may include a two-part construction of an inner wall member and an outer wall member to provide an insulating feature. The area between the inner and outer wall members may be filled with an insulating material, may be under vacuum, or it may provide a thermal barrier preventing condensation or sweating from cold or frozen contents.

As best shown in FIGS. 2-4, the lid base assembly 40 has a base housing 42 having a base cavity 41 generally defined by a base 39 of the base housing. The base 39 has a bottom surface facing the cavity 38 of the container body 30, and a top surface outwardly facing. In one embodiment, the base housing 42 has a pour aperture 44 formed in a fluid well 46 near the perimeter of the base housing 42 to allow the user to pour liquid from the beverage container 20. The pour aperture 44 and fluid well 46 may be sized and shaped to allow for liquid to be poured out of the beverage container 20 and for excess liquid in the fluid well 46 to drain back into the beverage container 20 if the pour aperture 44 is open (e.g., unsealed). In one example, the pour aperture 44 is formed at a base of a concave fluid well 46 of the lid assembly 40, the concave fluid well 46 directing fluid that is not poured from the pitcher 10 back through the pour aperture 44 and into the cavity 38 of the container body 30. Excess liquid may also remain in the fluid well 46 if the pour aperture 44 is closed (e.g., sealed) and the beverage container 20 is in a substantially upright position. The pour aperture 44 extends through the base 39 from the top surface to the bottom surface thereof. In one embodiment, the base housing 42 also has a fill opening 48 preferably positioned in the center of the base housing 42. The pour aperture 44 is fluidly associated with the cavity 38 of the container body 30. The base housing 42 may also have a threaded portion 43 (see FIGS. 3 and 4) that engages or mates with the threaded portion 33 of the container body 30. The base housing 42 may further have a handle 45 that allows a user to hold and/or manipulate the position of the beverage container 20. The base housing 42 may also have one or more retention cavities 47. In one embodiment the retention cavities 47 are preferably positioned within the portion of the base housing 42 defining the fill opening 48. The retention cavities 47 may be configured to receive and retain the lid sealing assembly 50.

In one embodiment, the fill opening 48 is sized and shaped to receive a portion of the lid sealing assembly 50. The fill opening 48 preferably has a ledge 49 for retention of accessory items discussed below. The fill aperture 48 is fluidly associated with the cavity 38 of the container body 30.

As shown in FIGS. 2-8, in one embodiment, the lid sealing assembly 50 is removably connected to the lid assembly 40 to close and seal the fill aperture 48 and the pour aperture 44. Accordingly, in one embodiment the lid sealing assembly 50 is operably and removably connected to the container body 30. In one embodiment the lid sealing assembly 50 has a housing 51 that is sized and shaped to be at least partially received by the base cavity 41 of the base housing 42. A fill opening sealing portion 52 may be sized and shaped to be received by the fill opening 48. The fill opening sealing portion 52 may have a fill opening sealing member 53, such as a gasket, an O-ring and the like. The fill opening sealing member 53, also referred to as a second seal 53, is configured to sealingly engage with the walls of the fill opening 48, such as by a friction fit, for example. Thus, when the fill opening sealing portion 52 is inserted into the fill opening 48, the fill opening sealing member 53 prevents liquid from passing through the fill opening 48. Thus, the lid sealing assembly 50 covers the fill aperture 48 in a first position and is adapted to provide access to the fill aperture 48 in a second position when the lid sealing assembly 50 is removed from the container body 30.

Figure 5:
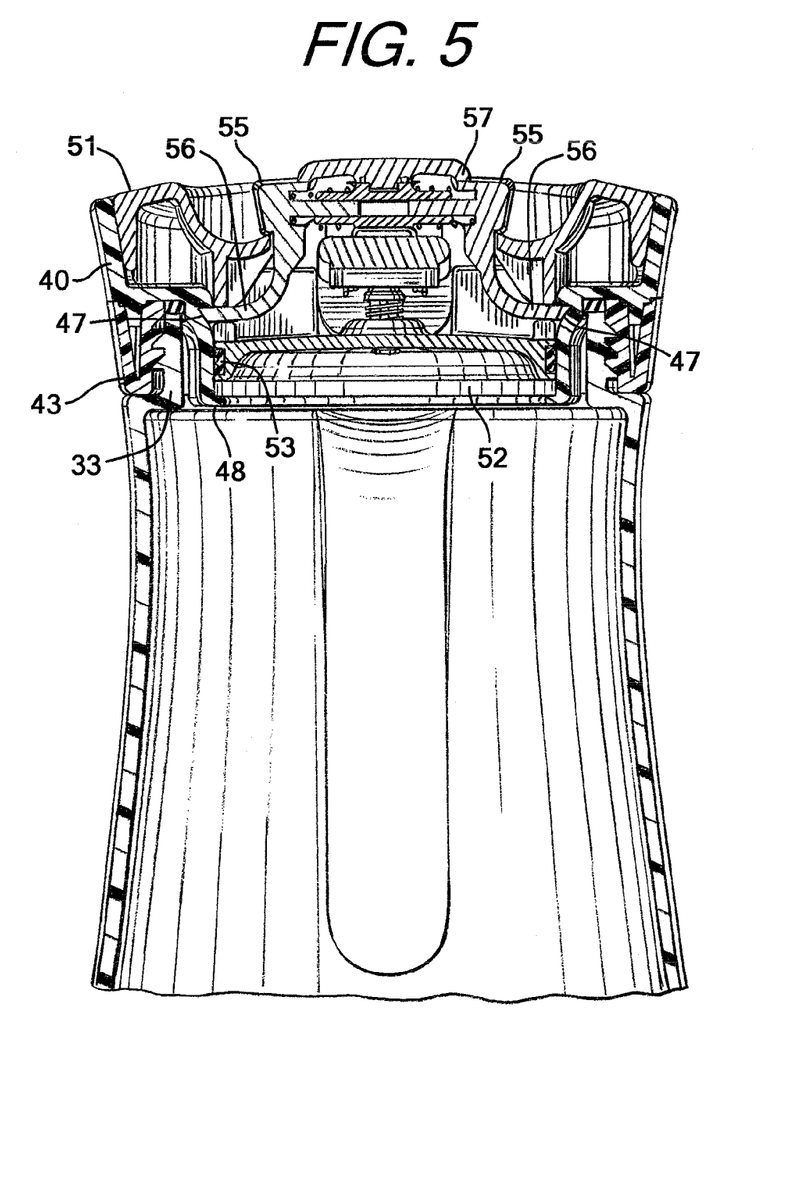
FIG. 5 is a front cross sectional view of a beverage pitcher showing the securing assembly in the closed position.
Figure 6:
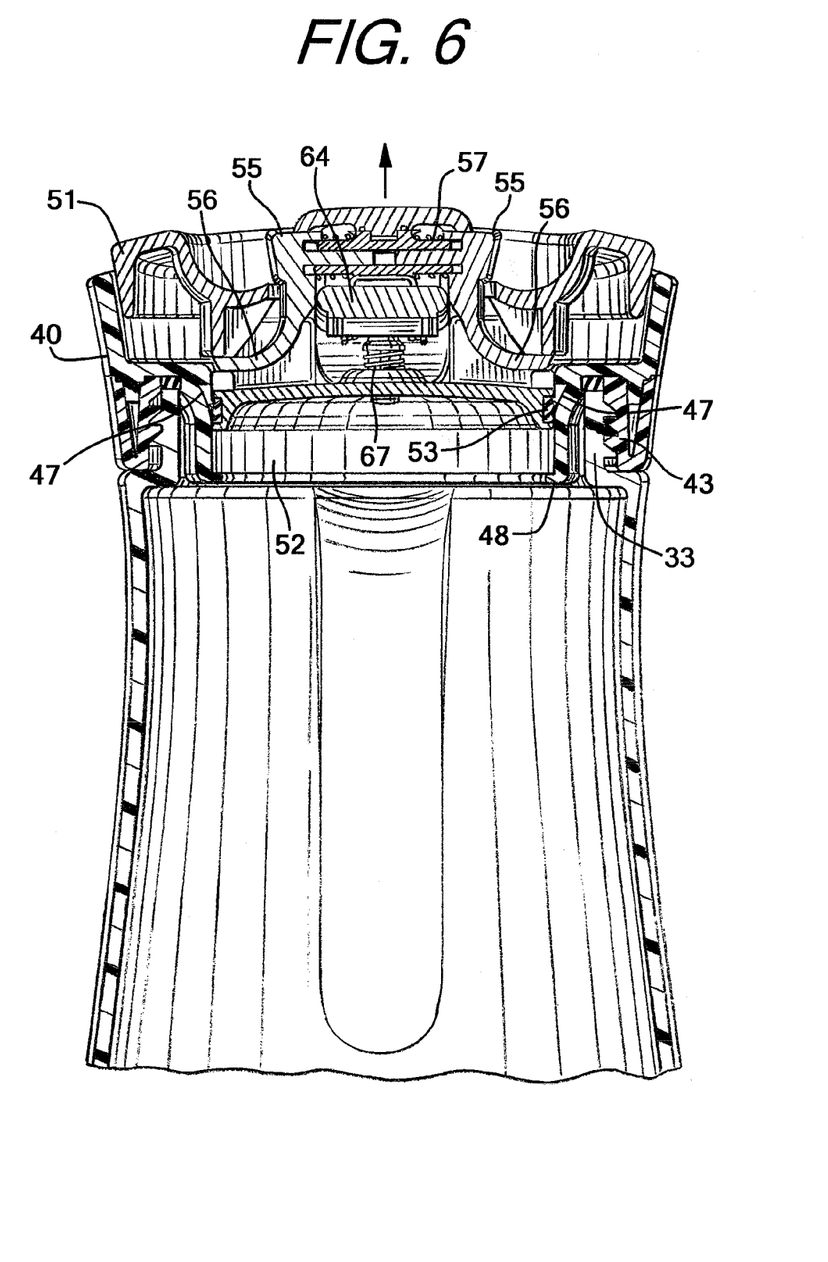
FIG. 6 is a front cross sectional view of a beverage pitcher showing the securing assembly in the open position for removal.
Figure 7:
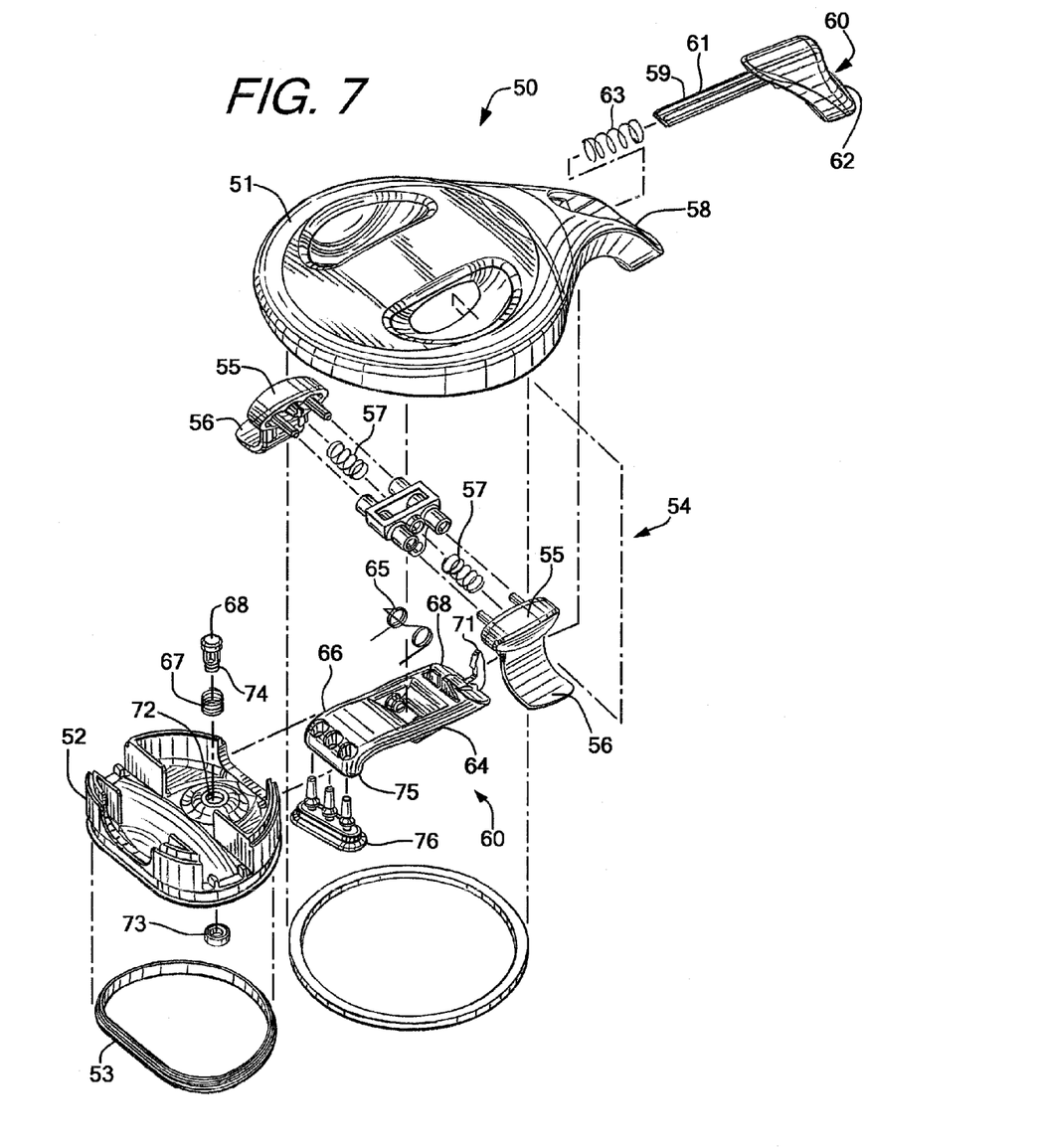
FIG. 7 is an exploded perspective view of a lid sealing mechanism for a beverage pitcher.

In one embodiment, the lid sealing assembly 50 may also have a securing assembly 54 to removably secure the lid sealing assembly 50 to the lid assembly 40. The securing assembly 54 may include at least one release member 55 (e.g., a button), at least one securing member 56 (e.g., a movable arm) and at least one biasing member 57 (e.g., a spring). The securing member 56 engages the lid assembly 40 to lock the lid sealing assembly 50 to the lid assembly 40 in the first position as shown in FIG. 5, and preferably to lock the lid sealing assembly 50 to the fill aperture 48 in a first position, and the release member 55 adapted to be manipulated by a user to cause movement of the securing member 56 to a second position to release the lid sealing assembly 50 from the fill aperture 48 as shown in FIG. 6. The securing member 56 is preferably sized and shaped to engage with the corresponding retention cavity 47 in the base housing 42. In a preferred embodiment there are separate cavities 47 on opposite sides of the fill opening 48 and separate securing members 56 that are positioned to engage each of the cavities 47, respectively, in addition to separate release members 55 and separate biasing members 57. The biasing member 57 may be positioned within a portion of the housing 51 and configured to bias the securing member 56 in the direction that mates the securing member 56 within the cavity 47 (e.g., outwards from the center). In a preferred embodiment, the release members 55 are adapted to be manipulated by a user to cause movement of the securing member 56 to a second position to release the lid sealing assembly 50 from the lid assembly 40. As shown in FIG. 6, when the release member 55 is pressed inward by a user's thumb or finger with enough force to overcome the biasing force of the biasing member 57, it causes the securing member 56 to slide inward enough to clear the cavity 47. This allows the lid sealing assembly 50 to be removed from the lid base assembly 40 by pulling the lid sealing assembly 50 upwards with enough force to overcome the friction fit of the fill opening sealing member 53 against the walls of the fill opening 48.

In one embodiment, the lid sealing assembly 50 has an actuation assembly 60. The actuation assembly 60 preferably operates to open and sealingly close the pour aperture 44. In one embodiment, the actuation assembly 60 may include an actuation arm 61, an actuation member 62 (e.g., a button) and a lever 64 having a pour aperture member 66 and a vent opening member 68. The lid sealing assembly 50 may further include an actuation biasing member 63, a lever biasing member 65, and a vent biasing member 67, each of which may be a spring, for example. The actuation member 62 is sized and shaped to be slidably received by a handle portion 58 of the housing 51, where the actuation biasing member 63 is configured to bias the actuation member 62 outwards, i.e., to the normal or unactuated position. The actuation member 62 may have a slot 59 that is sized and shaped to receive a first arm 71 of the lever 64, such that the first arm 71 slides within the slot 59 when the actuation member 62 slides inward or outward. In a preferred embodiment, the actuation member 62 is a push-button member 62 that is moveable between a normal position and a use position, and which operates the seal member 76.

In one embodiment, the actuation arm 61 is configured to engage a cammed surface of the lever 64, such that the lever 64 pivots about one or more pivot members 77 when the actuation member 62 slides inward or outward. The pivot members 77 are received by the housing 51 and in turn may receive the lever biasing member 65, which biases the lever 64 to stay in a closed or sealed position. The pivoting motion of the lever 64 causes the vent opening member 68 to slide up and down within a vent opening 72 in the housing 51. The vent opening 72 is preferably provided in the lid sealing assembly 50. The vent opening member 68 may have an end portion 74 that protrudes through the vent opening 72, and a vent sealing member 73 (e.g., an O-ring) connected to the protruding end portion 74. The vent biasing member 67 may be disposed on the other side of the vent opening 72 such that the vent biasing member 67 biases the vent opening member 68 upwards, causing the end portion 74 to pull the vent sealing member 73 against the housing 51 to seal the vent opening 72. In one embodiment, the actuation assembly 60 is operably connected to the vent seal 73 to move the vent seal 73 between the closed position (see FIG. 3) closing the vent opening 72, and the open position (see FIG. 4) to open the vent opening 72 when the actuation assembly 60 is actuated by the user.

A second arm 75 of the lever 64 is configured to be aligned with the pour aperture 44 and may be sized and shaped to seal the pour aperture 44. The second arm 75 may include a seal member 76, also referred to as a first seal 76, to seal the pour aperture 44 adjacent the top surface of the base 39 of the lid assembly 40. Preferably, the seal member 76 is made of a flexible material such as rubber, soft plastic and the like. The seal member 76 may be a separate component that attaches to the second arm 75, it may be overmolded onto the second arm, and the like. The seal member 76 is preferably positioned outside the cavity 38 of the container 30 and adjacent the pour aperture 44. The seal member 76 seals the pour aperture 44 when the actuator 62 is in the normal position, and the seal member 76 moves away from the pour aperture 44 to open the pour aperture 44 when the actuator 42 is in the use position. The pivoting motion of the lever 64 causes the second arm 75 to pivot up and away from the pour aperture 44 to open or unseal the pour aperture 44, and to pivot down and to contact the area around the pour aperture 44 to close or seal the pour aperture 44. The seal member 76 closes the pour aperture 44 when the push button 62 is in the normal position as shown in FIG. 3, and the seal member 76 is raised from the top surface of the base 39 to open the pour aperture 44 when the push button 62 is pushed inwardly in the use position as shown in FIG. 4. The actuation biasing member 63, as well as the lever biasing member 65, bias the seal member 76 toward the top surface of the base 39 to close the pour aperture 44.

In one embodiment, the actuation biasing member 63, the lever biasing member 65, and the vent biasing member 67 all act in combination to bias the lever 64 in the unactuated or sealed position. In other words, the force exerted by the user on the actuation member 62 must be sufficient to overcome the biasing forces of all three of the actuation biasing member 63, the lever biasing member 65, and the vent biasing member 67 in order to cause the lever 64 to pivot and unseal the pour aperture 44 and the vent opening 72.

Figures 8, 9:
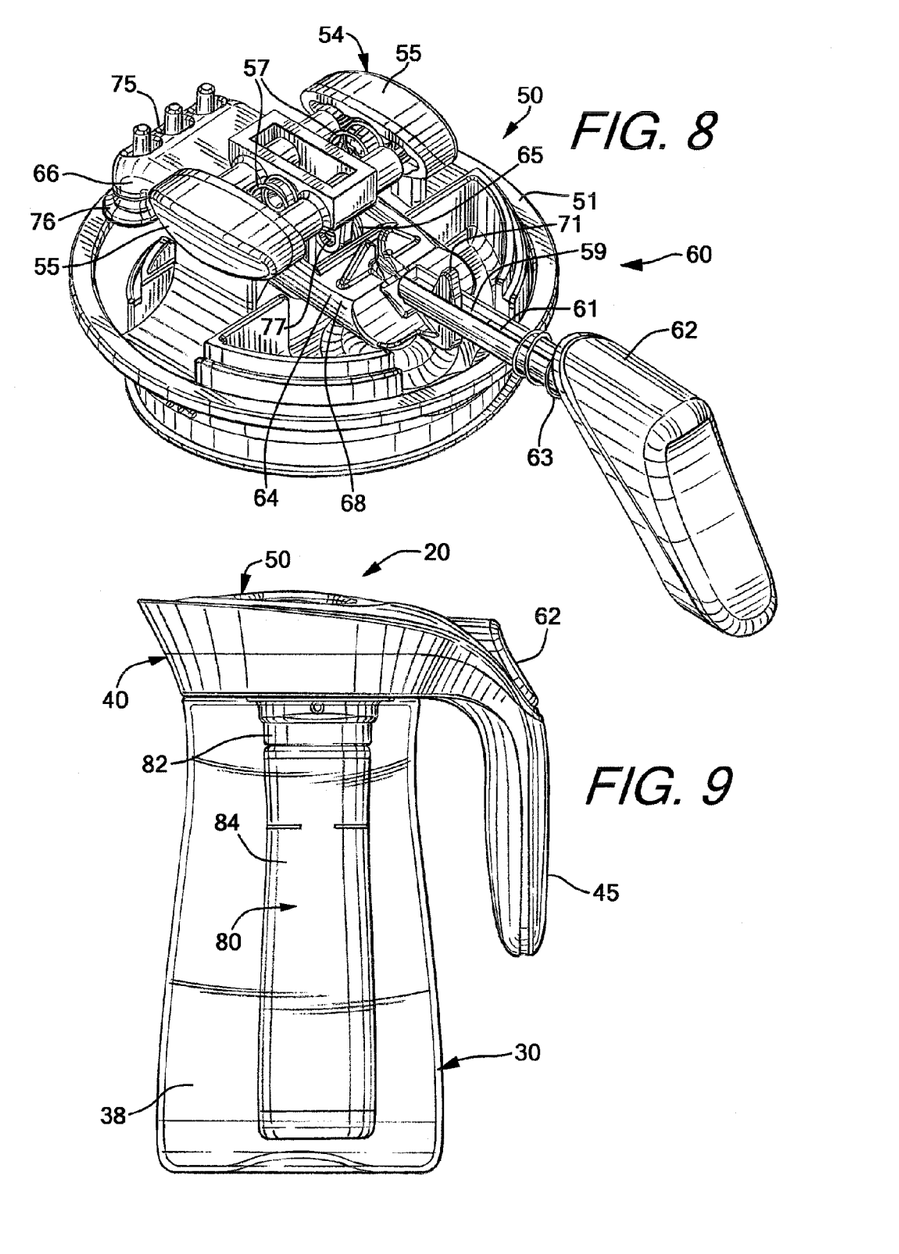
FIG. 8 is a perspective view of a lid sealing mechanism, with the top removed, for a beverage pitcher.
FIG. 9 is a side view of a beverage pitcher with an ice core assembly.
Figure 10:
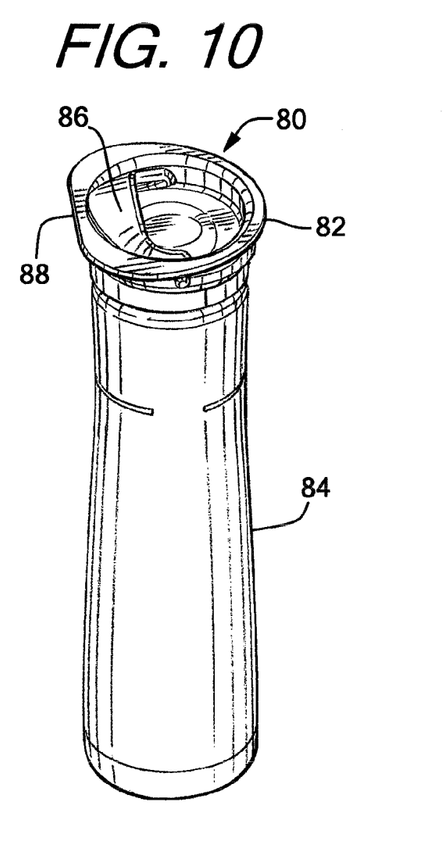
FIG. 10 is a perspective view of the ice core assembly of FIG. 9.

As shown in FIGS. 9-10, an ice core assembly 80 may be sized and shaped to be received by the fill opening 48 and extend into the liquid retaining cavity 38. The ice core assembly 80 may be filled with water or other liquid and frozen, such that it cools the liquid within the container body 30 when it is inserted. The ice core assembly 80 may have a cover portion 82 that is configured to engage with and connect to a body portion 84, such as by a friction fit, threaded connections and the like. The cover portion 82 may have a handle 86, allowing the ice core assembly 80 to be easily lifted up and out of the beverage container 20. The cover portion 82 may have a flange 88 configured to engage with the ledge 49 (see FIG. 2) to prevent the ice core assembly 80 from passing all the way through the fill opening 48 and dropping into the liquid.

Figure 11:
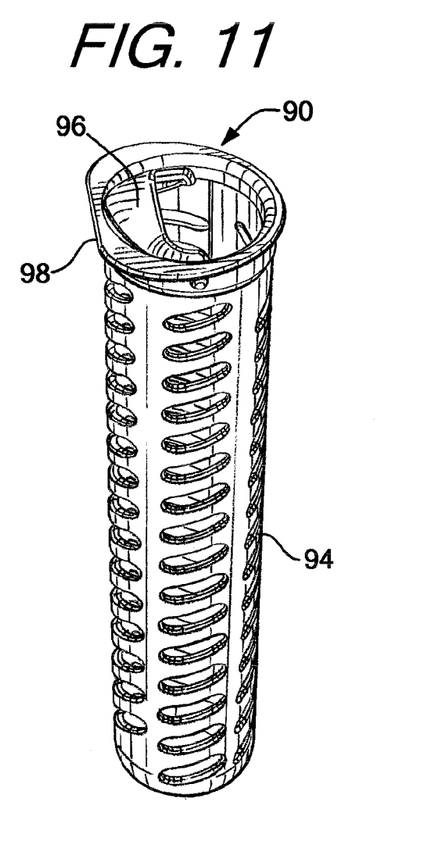
FIG. 11 is a perspective view of the infuser assembly.

As shown in FIG. 11, a removable infusion assembly 90 may replace the removable ice core assembly 80. The infusion assembly 90 may be sized and shaped to be received by the fill opening 48 and extend into the liquid retaining cavity 38. The infusion assembly 90 may be filled with fruit or other substances, such that it infuses the liquid within the container body 30 with a flavor when it is inserted. The infusion assembly 90 may have a body 94 and a handle 96, allowing the infusion assembly 90 to be easily lifted up and out of the beverage container 20. The infusion assembly 90 may have a flange 98 configured to engage with the ledge 49 to prevent the infusion assembly 90 from passing all the way through the fill opening 48 and dropping into the liquid.

In operation, in one embodiment a user may put a thumb or finger on the actuation member 62 and push inward to slide the actuation member 62 inward and cause the lever 64 to pivot. The pivoting of the lever 64 causes the vent opening member 68 to unseal the vent opening 72 and the second arm 75 to unseal the pour aperture 44. The beverage container 20 may then be tipped forward from an upright position to cause liquid to flow out of the pour aperture 44. When pouring is complete, the user may release the actuation member 62 (e.g., stop pressing or pushing the actuation member), allowing the biasing forces of the actuation biasing member 63, the lever biasing member 65, and the vent biasing member 67 to pivot the lever 64 back to the sealed position, thereby sealing the pour aperture 44 and the vent opening 72.

In further operation, the release members 55 may be pushed or squeezed inwards, such as with a thumb and a finger, thereby releasing the lid sealing assembly 50 from being secured to the base housing 42. The lid sealing assembly 50 may then be pulled upward and removed from the base housing 42, allowing easy access to the fill opening 48, which allows the container body 30 to be filled with liquid and or ice. Either the ice core assembly 80 or the infusion assembly 90 may be inserted into the fill opening 48 and the lid sealing assembly 50 may be inserted back into the base housing 42 by pushing or squeezing the release members 55 and pushing the lid sealing assembly 50 down into the base cavity 41.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A pitcher, comprising:
 a container body having a cavity;
 a lid assembly removably connected to the container body, the lid assembly having a pour aperture and a separate fill aperture; and,
 a lid sealing assembly removably connected to the lid assembly to close and seal the fill aperture, the lid sealing assembly comprising a housing disposed adjacent the pour aperture of the lid assembly, the lid sealing assembly further having a vent and an actuation assembly that is partially disposed in the housing and comprising an actuator and a lever pivotably coupled to and operated by the actuator to open and sealingly close the pour aperture and the vent;
 wherein the lid sealing assembly opens the fill aperture when removed, and
 wherein the housing has a top surface and a bottom surface such that the lever is between the top surface and the bottom surface.

2. The pitcher of claim 1, wherein the lid assembly has a base with a bottom surface facing the cavity of the container body and the top surface outwardly facing, wherein the pour aperture extends through the base from the top surface to the bottom surface thereof, and wherein the actuation assembly has a seal member configured to seal the pour aperture adjacent the top surface of the base of the lid assembly.

3. The pitcher of claim 2, wherein the actuator comprises a push button member moveable between a normal position and a use position, the seal member closing the pour aperture when the push button is in the normal position and the seal member being raised from the top surface of the base to open the pour aperture when the push button member is in the use position.

4. The pitcher of claim 3, further comprising a biasing member to bias the push button member to the normal position.

5. The pitcher of claim 3, further comprising a biasing member to bias the seal member toward the top surface of the base to close the pour aperture.

6. The pitcher of claim 1, wherein the lid sealing assembly has a vent opening and a vent seal, and wherein the actuation assembly is operably connected to the vent seal to move the vent seal between a closed position closing the vent opening, and an open position to open the vent opening when the actuation assembly is actuated by a user.

7. The pitcher of claim 1, wherein the lid sealing assembly partially fits within the fill aperture of the lid assembly.

8. The pitcher of claim 1, wherein the lid sealing assembly has a first seal that seals the pour aperture, and a second seal that seals the fill aperture.

9. The pitcher of claim 1, wherein the lid sealing assembly has a securing assembly to removably secure the lid sealing assembly to the lid assembly, the securing assembly having a securing member and a release member, the securing member engaging the lid assembly to lock the lid sealing assembly to the lid assembly in a first position, the release member adapted to be manipulated by a user to cause movement of the securing member to a second position to release the lid sealing assembly from the lid assembly.

10. The pitcher of claim 1, wherein the lid assembly has a handle extending therefrom.

11. The pitcher of claim 1, wherein the container body has a first mating member and the lid assembly has a second mating member, and wherein the first mating member mates with the second mating member to removably secure the lid assembly to the container body.

12. The pitcher of claim 1, wherein the pour aperture is formed at a base of a concave fluid well of the lid assembly, the concave fluid well directing fluid that is not poured from the pitcher back through the pour aperture and into the cavity of the container body.

13. A pitcher, comprising:
a container body having a liquid retaining cavity;
a pour aperture fluidly associated with the cavity of the container body, a vent fluidly associated with the cavity of the container body, and a separate fill aperture fluidly associated with the cavity of the container body; and
a lid sealing assembly operably and removably connected to the container body, the lid sealing assembly covering the fill aperture in a first position and adapted to provide access to the fill aperture in a second position, the lid sealing assembly having a housing disposed adjacent the pour aperture and an actuation assembly partially disposed in the housing, the actuation assembly having a push-button actuated actuator, a lever pivotably coupled to the actuator, and a seal member coupled to the lever, the actuator being moveable between a normal position and a use position to operate the seal member via the lever, the seal member being positioned outside the cavity of the container body and adjacent the pour aperture, the seal member sealing the pour aperture when the actuator is in the normal position and the seal member being moved from the pour aperture to open the pour aperture when the actuator is in the use position;
wherein the housing has a top surface and a bottom surface such that the lever is between the top surface and the bottom surface, and
wherein the lever opens the vent when the actuator is moved to the use position.

14. The pitcher of claim 13, further comprising a second seal that seals the lid sealing assembly to the fill aperture to sealingly close the fill aperture.

15. The pitcher of claim 13, wherein the lid sealing assembly has a securing assembly that partially fits within the fill aperture and that secures the lid sealing assembly to the fill aperture.

16. The pitcher of claim 15, wherein the securing assembly has a securing member and a release member, the securing member locking the lid sealing assembly to the fill aperture in a first position, the release member adapted to be manipulated by a user to cause movement of the securing member to a second position to release the lid sealing assembly from the fill aperture.

17. The pitcher of claim 13, further comprising a base with a bottom surface facing the cavity of the container body and the top surface outwardly facing, wherein the pour aperture extends through the base from the top surface to the bottom surface thereof, and wherein the seal member of the actuation assembly seals the pour aperture adjacent the top surface of the base when the actuator is in the normal position.

18. A pitcher, comprising:
a container body having a liquid retaining cavity;
a base adjacent a top of the liquid retaining cavity of the container body, the base having a base bottom surface facing the cavity of the container body and a base top surface outwardly facing;
a pour aperture extending through the base from the base top surface to the base bottom surface thereof, the pour aperture fluidly associated with the cavity of the container body; and,
a lid sealing assembly removably connected to the container body, the lid sealing assembly having a housing, a vent, and an actuation assembly having a push-button actuated actuator, an actuation arm operated by the actuator, a lever pivotably coupled to and operated by the actuation arm, and a seal member coupled to the lever, the actuator being moveable between a normal position and a use position to operate the seal member via the actuation arm and the lever, the seal member being positioned outside the cavity of the container body and adjacent the pour aperture, the seal member sealing the pour aperture adjacent the base top surface of the base when the actuator is in the normal position and the seal member being moved away from the base top surface of the base to open the pour aperture when the actuator is in the use position;
wherein the housing has a housing top surface and a housing bottom surface such that the lever is between the housing top surface and the housing bottom surface, and
wherein the lever opens the vent when the actuator is moved to the use position.

19. The pitcher of claim 18, further comprising a fill aperture extending through the base from the base top surface to the base bottom surface thereof, the fill aperture fluidly associated with the cavity of the container body, the fill aperture being separate from the pour aperture.

20. The pitcher of claim 19, wherein the lid sealing assembly has a securing assembly to secure the lid sealing assembly to the base, wherein the securing assembly has a securing member and a release member, the securing member locking the lid sealing assembly to base in a first position, the release member adapted to be manipulated by a user to cause movement of the securing member to a second position to release the lid sealing assembly from the base.

21. The pitcher of claim 18, wherein the lever has a first outwardly extending arm and a second outwardly extending arm, the first outwardly extending arm of the lever movable in a slot formed in the actuation arm as the actuator moves between the normal position and the use position, and the second outwardly extending arm of the lever aligned with the pour aperture and carrying the seal member.

\* \* \* \* \*